US005885722A

United States Patent [19]

Ritter

[11] Patent Number: 5,885,722

[45] Date of Patent: Mar. 23, 1999

[54] METHOD FOR APPLYING COATING MATERIALS TO OVERLAPPED INDIVIDUALS SHEETS

[75] Inventor: Johannes A. Ritter, Seeheim-Jugenheim, German Dem. Rep.

[73] Assignee: Minnesota Mining and Manufacturing, St. Paul, Minn.

[21] Appl. No.: 22,996

[22] Filed: Feb. 12, 1998

Related U.S. Application Data

[60] Continuation of Ser. No. 484,531, Jun. 7, 1995, abandoned, which is a division of Ser. No. 196,490, Feb. 15, 1994, Pat. No. 5,487,780.

[51] Int. Cl.[6] .................................................. B29C 71/02

[52] U.S. Cl. .................. 428/541; 427/208.6; 427/208.8; 427/209; 427/210; 427/211; 427/261; 427/285; 427/288; 427/391; 427/411; 427/428; 427/542; 427/591; 427/595

[58] Field of Search ............................ 427/208.6, 208.8, 427/209, 210, 211, 261, 285, 288, 391, 411, 428, 541, 542, 591, 595, 543

[56] References Cited

U.S. PATENT DOCUMENTS

| | | | |
|---|---|---|---|
| 2,060,800 | 11/1936 | Ehrig et al. | 271/28 |
| 2,146,945 | 2/1939 | Ehrig et al. | 271/12 |
| 3,426,754 | 2/1969 | Bierenbaum et al. | 604/307 |

(List continued on next page.)

FOREIGN PATENT DOCUMENTS

| | | | |
|---|---|---|---|
| 0 070 524 | 7/1982 | European Pat. Off. . | |
| 0 163 127 | 12/1985 | European Pat. Off. | B65H 35/07 |
| 0 270 833 | 11/1987 | European Pat. Off. . | |

(List continued on next page.)

OTHER PUBLICATIONS

"Thermoplastic Polyamide Adhesives," pp. 92–97, undated (with abstract).

1985 Polymers, Laminating & Coatings Conference, "New Advances in High Performance Water Based Pressure Sensitive Adhesives," pp. 469–475 (No month avail.).

Adhesion, "Adhesive Label Sheet," vol. 28, No. 10, pp. 21–26, 1984 (No month avail.).

Adhesion, "Latex PSA Coating," vol. 27, No. 3, pp. 30–33, 1983 (No month avail.).

Adhesion, "Testing of Self–Adhesive Dispersions with Applied Amount as Parameter," pp. 16–18, 1986 (No month avail.).

Adhesives Age, "Drying Waterborne PSAs," pp. 44–47, Sep. 1984.

Adhesives Age, "Formulation and Performance of Water–Based PSAs," pp. 29–32, Sep. 1984.

Adhesives Age, "Overcoming Substrate Problems in Waterborne Laminating," pp. 22–24, Feb. 1986.

Adhesives Age, "Rheological Characterization of Elastomer Latexes for PSAs," pp. 24–28, Sep. 1986.

Adhesives Technology Handbook, "Adhesive Types and Their Properties and Applications," pp. 183–185, 1985 (No month avail.).

Advances in Adhesives: Applications, Materials and Safety, "Water–Based Adhesives: Past, Present and Future," pp. 123–130, 1983 (No month avail.).

Billhofer brochure, undated.

Billhofer brochure, 1986 (No month avail.).

(List continued on next page.)

*Primary Examiner*—Bernard Pianalto

*Attorney, Agent, or Firm*—Carolyn V. Peters

[57] ABSTRACT

A method and apparatus for applying pressure sensitive adhesive to a substrate, in which the adhesive is deposited on a transfer surface, such as a circulating transfer belt, dried, and subsequently transferred to a plurality of overlapping sheets. The sheets are preferably coated with a primer or a low adhesion backsize, or both, prior to application of the adhesive.

10 Claims, 7 Drawing Sheets

U.S. PATENT DOCUMENTS

| | | | |
|---|---|---|---|
| 3,467,060 | 9/1969 | Klebanow et al. | 118/58 |
| 3,523,846 | 8/1970 | Muller | 156/78 |
| 3,565,728 | 2/1971 | Alton | 156/566 |
| 3,575,134 | 4/1971 | Quint | 118/122 |
| 3,590,452 | 7/1971 | Macleod | 29/115 |
| 3,607,579 | 9/1971 | Enskat et al. | 156/571 |
| 3,645,835 | 2/1972 | Hodgson | 428/195 |
| 3,655,488 | 4/1972 | Goldstein et al. | 156/380 |
| 3,676,184 | 7/1972 | Spearin et al. | 117/68 |
| 3,677,788 | 7/1972 | Zirnite | 428/181 |
| 3,691,140 | 9/1972 | Silver | 526/240 |
| 3,857,731 | 12/1974 | Merrill, Jr. et al. | 117/122 |
| 3,861,351 | 1/1975 | Bonwit et al. | 118/685 |
| 3,897,780 | 8/1975 | Trousil | 604/344 |
| 3,934,066 | 1/1976 | Murch | 428/248 |
| 4,024,679 | 5/1977 | Rain et al. | 52/2.19 |
| 4,024,814 | 5/1977 | Becker | 101/410 |
| 4,054,710 | 10/1977 | Betsolas | 428/228 |
| 4,068,615 | 1/1978 | LeNir | 118/6 |
| 4,112,177 | 9/1978 | Salditt et al. | 428/315.9 |
| 4,163,822 | 8/1979 | Walter | 428/317.3 |
| 4,165,404 | 8/1979 | Quehl | 428/212 |
| 4,166,152 | 8/1979 | Baker et al. | 428/522 |
| 4,193,178 | 3/1980 | McArthur et al. | 29/129.5 |
| 4,202,925 | 5/1980 | Dabroski | 428/219 |
| 4,214,743 | 7/1980 | Meier | 271/182 |
| 4,219,376 | 8/1980 | Roman | 156/209 |
| 4,325,321 | 4/1982 | Wahnschaff | 118/245 |
| 4,327,153 | 4/1982 | Micheron | 428/421 |
| 4,407,867 | 10/1983 | Bruck et al. | 427/365 |
| 4,413,562 | 11/1983 | Fischer | 101/408 |
| 4,416,448 | 11/1983 | Meier | 270/55 |
| 4,427,737 | 1/1984 | Cilento et al. | 428/315.7 |
| 4,442,162 | 4/1984 | Kuester | 428/245 |
| 4,495,318 | 1/1985 | Howard | 524/375 |
| 4,526,362 | 7/1985 | Thierstein | 271/186 |
| 4,558,888 | 12/1985 | Hanson et al. | 281/23 |
| 4,566,014 | 1/1986 | Paranjpe et al. | 346/1.1 |
| 4,598,112 | 7/1986 | Howard | 524/78 |
| 4,612,074 | 9/1986 | Smith et al. | 156/85 |
| 4,698,110 | 10/1987 | Vasillios | 156/231 |
| 4,764,402 | 8/1988 | Pagendarm et al. | 427/355 |
| 4,798,201 | 1/1989 | Rawlings et al. | 602/52 |
| 4,805,552 | 2/1989 | Pagendarm et al. | 118/325 |
| 4,822,670 | 4/1989 | Ono et al. | 428/317.3 |
| 4,883,209 | 11/1989 | Hebels | 226/92 |
| 4,886,564 | 12/1989 | Pagendarm et al. | 156/230 |
| 4,886,680 | 12/1989 | Tindall | 427/8 |
| 4,904,425 | 2/1990 | Hebels et al. | 264/40.1 |
| 4,967,740 | 11/1990 | Riedel | 602/44 |
| 4,973,040 | 11/1990 | Kemp et al. | 271/277 |
| 4,973,513 | 11/1990 | Riedel | 428/252 |
| 5,009,408 | 4/1991 | Pulskamp | 270/57 |
| 5,029,832 | 7/1991 | Orsinger et al. | 270/54 |
| 5,032,460 | 7/1991 | Kantner et al. | 428/449 |
| 5,045,569 | 9/1991 | Delgado | 521/60 |
| 5,067,699 | 11/1991 | Gadway et al. | 270/55 |
| 5,085,167 | 2/1992 | Hebels | 118/65 |
| 5,211,992 | 5/1993 | Newton et al. | 427/512 |
| 5,212,877 | 5/1993 | Onur et al. | 34/29 |

FOREIGN PATENT DOCUMENTS

| | | | |
|---|---|---|---|
| 0 439 941 | 8/1991 | European Pat. Off. | C09J 7/02 |
| 0 455 615 | 11/1991 | European Pat. Off. | B42D 5/02 |
| 2 568 146 | 7/1984 | France | B05C 9/04 |
| 15 94 309 | 9/1969 | Germany . | |
| 15 94 060 | 7/1970 | Germany . | |
| 17 52 337 | 5/1971 | Germany . | |
| 24 17 312 | 10/1974 | Germany . | |
| 24 25 130 | 12/1975 | Germany | B05C 1/08 |
| 76 70 712 | 4/1976 | Germany . | |
| 28 36 319 | 3/1979 | Germany . | |
| 40 35 091 | 11/1980 | Germany . | |
| 31 21 992 | 12/1982 | Germany | B31D 1/00 |
| 32 19 094 | 11/1983 | Germany . | |
| 34 17 746 | 11/1985 | Germany . | |
| 36 28 784 | 8/1986 | Germany . | |
| 36 32 816 | 9/1986 | Germany . | |
| 36 065 199 | 8/1987 | Germany . | |
| 37 41 680 | 12/1987 | Germany . | |
| 40 13 776 | 4/1990 | Germany . | |
| 49-111436 | 11/1947 | Japan . | |
| 49-112819 | 12/1947 | Japan . | |
| 58-53975 | 3/1973 | Japan . | |
| 50-79534 | 6/1975 | Japan . | |
| 52-52936 | 4/1977 | Japan . | |
| 52-123437 | 10/1977 | Japan . | |
| 52-30481 | 3/1981 | Japan . | |
| 57-12084 | 1/1982 | Japan . | |
| 57-78471 | 5/1982 | Japan . | |
| 57-115479 | 7/1982 | Japan . | |
| 58-96670 | 6/1983 | Japan . | |
| 58-167667 | 10/1983 | Japan . | |
| 58-174484 | 10/1983 | Japan . | |
| 58-222170 | 12/1983 | Japan . | |
| 59-176376 | 10/1984 | Japan . | |
| 60-248786 | 12/1985 | Japan . | |
| 61-10 | 1/1986 | Japan . | |
| 2-252531 | 10/1990 | Japan | B29C 65/52 |
| 4-14434 | 1/1992 | Japan . | |
| 5-178530 | 7/1993 | Japan | B65H 43/04 |
| 52-89138 | 11/1993 | Japan . | |
| 60-26077 | 2/1994 | Japan . | |
| 69 13302 | 11/1969 | Taiwan . | |
| 70 11019 | 4/1970 | Taiwan . | |
| 71 11864 | 6/1971 | Taiwan . | |
| 71 13269 | 10/1971 | Taiwan . | |
| 72 12276 | 5/1972 | Taiwan . | |
| 74 104215 | 9/1974 | Taiwan . | |
| 76 105671 | 12/1976 | Taiwan . | |
| 64 11547 | 7/1978 | Taiwan . | |
| 72 11663 | 5/1983 | Taiwan . | |
| 72 13834 | 11/1983 | Taiwan . | |
| 72 14566 | 12/1983 | Taiwan . | |
| 74 105175 | 11/1985 | Taiwan . | |
| 2 034 203 | 6/1980 | United Kingdom | B05C 11/02 |
| 2 089 687 | 6/1982 | United Kingdom | B05C 13/00 |
| 2 248 412 | 4/1992 | United Kingdom | B05C 1/16 |
| WO 87/05315 | 9/1987 | WIPO . | |

OTHER PUBLICATIONS

Canadian Packaging, "Custom Coaters," pp. 22–23, Nov. 1984.

Converter, "Pressure Sensitive Adhesive Products for Industry—A Real Opportunity for Profit Growth," pp. 18–20, Sep. 1979.

Converter, "Water–Based Adhesives and Coatings for Packaging Applications," pp. 18–22, Nov. 1976.

Converter, "Where are we at the Hotmelt Pressure–Sensitive Coated Label Stock?" pp. 16–19, undated.

Handbook of Pressure–Sensitive Adhesive Technology, "Drying," pp. 867–868, 1982 (No month avail.).

Handbook of Pressure–Sensitive Adhesive Technology, pp. 547–548, undated.

Handbook of Pressure–Sensitive Adhesive Technology, "Saturated Paper and Saturated Paper Tapes," pp. 675–690, 1982 (No month avail.).

Handbook of Pressure–Sensitive Adhesive Technology, "Silicone Release Coatings," Chapter 18, pp. 384–403, 1982 (No month avail.).

Int. J. Adhesion and Adhesives, "Focus on Pressure Sensitive Adhesives," pp. 196–198, Jul. 1982.

Japan Society of Adhesion, "Dynamic Viscoelastic Measurements of Coating Films During the Drying Process," vol. 20, No. 11, 1984 (No month avail.).

Journal of Adhesion and Sealing, "Adhesion and Adhesives," vol. 30, No. 2, 1986 (No month avail.).

Journal of Adhesion and Sealing, "Adhesive Sheets," vol. 28, No. 2, 1984 (with abstract) (No month avail.).

Journal of Adhesion and Sealing, "Development of Water Borne PSAs," vol. 28, No. 2, Apr. 1980 (with abstract).

Journal of Adhesion and Sealing, "Outlook on PSA and Coating Costs," Jun. 1980.

Journal of Adhesion and Sealing, "Problems of Water Borne PSAs," vol. 29, No. 11, 1985 (with abstract) (No month avail.).

Journal of Adhesion and Sealing, "PSAs and Line Coating," vol. 28, No. 4, 1984 (No month avail.).

Journal of the Adhesion Society of Japan, "Physical Properties of Pressure Sensitive Adhesive Tape," vol. 16 No. 8, 1980 (No month avail.).

Journal of the Adhesion Society of Japan, "The Influence of Interfacial Force and Mechanical Properties of Coatings and Adhesion," vol. 20, No. 5, 1984 (No month avail.).

Journal of the adhesion Society of Japan, "The Survey of Pressure Sensitive Adhesive Technology," vol. 18, No. 8, 1982 (No month avail.).

Kirk–Othmer Encyclopedia of Chemical Technology, "Coating Processes," pp. 386–426, vol. 6, 1979 (No month avail.).

Korber brochure, "Paper is our Passion," Apr. 1994.

Packaging, "Fifty Years Since the First Label," pp. 32–33, Jun. 1985.

Pagendarm brochure, "Coating Heads," undated.

Pagendarm brochure, "Dryers," undated.

Paper Processing and Pressure, "Paper Converting and Printing," pp. 1356–1360, 1985 (No month avail.).

Plastics Age, "Present and Future of Adhesive Coating Technology," vol. 28, No. 6, Jun. 1982.

Pressure Sensitive Adhesives—Formulations and Technology, pp. 158–159, undated.

Pulp and Paper Science and Technology, pp. 412–421, undated.

Pulp and Paper, pp. 1360–1361, undated.

Svensk Paperstidning, "The Setting of Aqueous Adhesives on Coated Board," pp. R23–R28, 1984 (No month avail.).

Tappi Paper Synthesis Conference, "Meeting the Demands of the 80s with Water–Borne Laminating Adhesives," pp. 175–180, Sep. 15–17, 1980.

Tappi, "Alternatives to Solvent–Borne Systems for Pressure–Sensitive Adhesives," pp. 107–108, Jul. 1980.

Tappi, "The Setting of Aqueous Adhesives on Paper," pp. 63–65, Dec. 1978.

Technology on Adhesion and Sealing, "Problems for Water Borne PSAs," vol. 30, No. 2, 1986 (with abstract) (No month avail.).

The Paper Specialists of the Korber Group brochure, undated.

William Brushwell Reports, "Coatings Update," 1981 (No month avail.).

METHOD FOR APPLYING COATING MATERIALS TO OVERLAPPED INDIVIDUALS SHEETS

This is a continuation of U.S. patent application Ser. No. 08/484,531, filed Jun. 7, 1995, abandoned, which is a divisional of U.S. patent application Ser. No. 08/196,490, filed Feb. 15, 1994, issued as U.S. Pat. No. 5,487,780 on Jan. 30, 1996.

TECHNICAL FIELD

The invention relates to a method and apparatus for the application of a coating material such as pressure sensitive adhesive, to individual sheets, such as sheets of paper.

BACKGROUND OF THE INVENTION

It is desirable in some fields to apply pressure sensitive adhesive to a paper substrate and several methods are known for performing this process. German patent application 36 06 199, for example, discloses a method and apparatus for applying pressure sensitive adhesive on a continous web of paper. The web is coated with a primer, or adhesion promoter and dried in a first drying station. Next, an optional low adhesion backsize, or release layer, may be coated onto the opposite surface of the web and dried at a second drying station. Finally, a circulating intermediate carrier applies the pressure sensitive adhesive, which has been partially dried while on the intermediate carrier, over the primer layer. The paper web may then be collected and further processed as desired.

The various drying steps disclosed in the '199 patent (drying the primer layer, drying the low adhesion backsize layer, and drying the adhesive layer while on the intermediate carrier) remove moisture from the aqueous primer, backsize and adhesive materials, to prevent the paper web from curling or wrinking. However, the sequential application and drying of the primer and low adhesion backsize layers typically result in some curling of the paper web, which is undesirable. The curling problem would be more pronounced in the context of the application of a primer, low adhesion backsize, and adhesive to individual paper sheets rather than a paper web, because the web is typically in tension whereas the individual sheets are not. Thus, the method and apparatus of the '199 patent typically is not suitable for use with individual paper sheets.

It is therefore desirable to provide a method and apparatus for applying primer, low adhesion backsize, and pressure sensitive adhesive to a plurality of individual paper sheets without inducing curling or cockling of the sheets.

SUMMARY OF THE INVENTION

The present invention includes within its scope an apparatus for applying a coating material to a plurality of sheets as the sheets are conveyed past the apparatus. The apparatus comprises means for supplying a plurality of sheets, means for overlapping the sheets, such that a minor portion of each sheet overlies a portion of an adjacent sheet, and a minor portion of each sheet underlies a portion of a second adjacent sheet, a coating station comprising means for receiving coating material from a supply of such material, and for applying the coating material to a first major surface of the overlapping sheets as the sheets are conveyed past the coating station, and means for collecting the coated sheets. In one embodiment, the coating material is a pressure sensitive adhesive, and the sheets are sheets of paper.

Also provided is a method of applying a coating material to a plurality of sheets. The method comprises the steps of providing a plurality of sheets, overlapping the sheets, such that a minor portion of each sheet overlies a portion of an adjacent sheet, and that a minor portion of each sheet underlies a portion of a second adjacent sheet, providing a source of coating material, applying a coating material to a first major surface of the overlapping sheets as the sheets are conveyed past the coating station, and collecting the coated sheets. In one embodiment of the inventive method, the coating material is a pressure sensitive adhesive, and the sheets are sheets of paper. Also provided is a sheet coated with a coating material according to the foregoing method.

BRIEF DESCRIPTION OF THE DRAWINGS

The present invention will be further explained with reference to the appended figures, wherein like structure is referred to by like numerals throughout the several views, and wherein.

DETAILED DESCRIPTION OF THE INVENTION

The present invention is preferably directed to the application of primer, low adhesion backsize, and pressure sensitive adhesive to a plurality of individual sheets of paper, and will be described primarily in that context. However, the present invention also has a broader applicability to the deposition of coating materials onto individual sheets of any type, and should be so understood.

Figure 1:
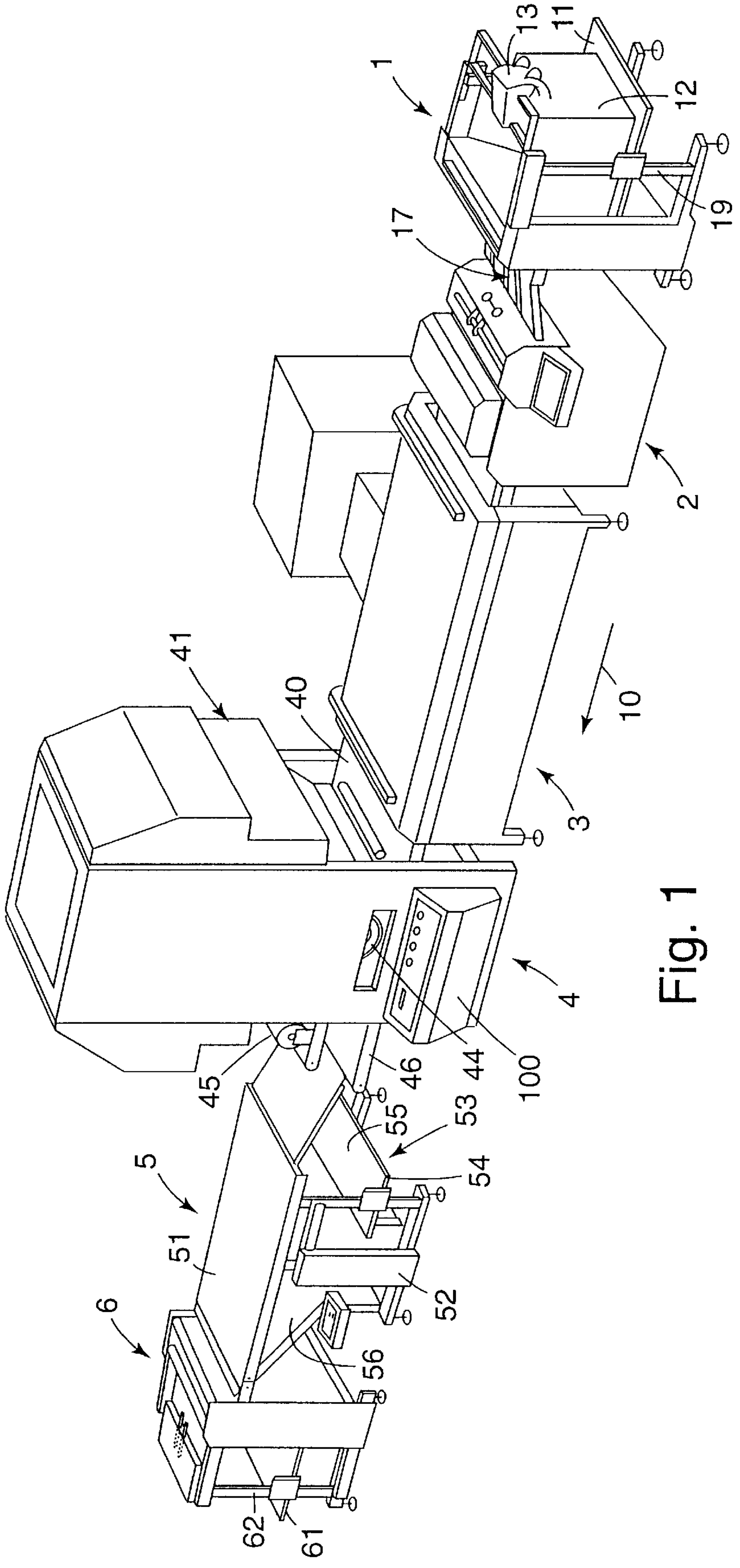
FIG. 1 is a schematic perspective view of an apparatus according to the present invention.

In the illustrated embodiment, a preferred apparatus according to the present invention consists of six stations, arranged one after the other so that the sheets are conveyed through the respective stations in a transporting direction indicated by the arrow 10 in FIG. 1. The stations include a sheet supplying station 1, a double coating station 2, a sheet conveying station with high frequency dryer 3, a coating station 4, a sheet inserting station 5 and a sheet stacking station 6, which are described in further detail below. These stations each have separate drive mechanisms, which are controlled by a central computer 100 to synchronize the respective drive mechanisms.

Sheet supplying station 1 has a table 11 for receiving a stack 12 of individual paper sheets. The sheets are preferably all of equal size and weight—50 cm by 70 cm (19.7 in by 27.6 in) and 80 g/cm$^2$, for example. A sheet lifter 13, mounted atop sheet supplying station 1, has a vacuum head 15 the suction orifice of which depends down to the uppermost sheet of stack 12. For removing the uppermost sheet from the stack 12 the suction orifice gets into contact with the rim area of that sheet which adjoints vertical outer surface 114 of the stack 12. When the head 15 rises, the outer end of the uppermost sheet is lifted. A stream of air is injected between the lifted portion of the uppermost sheet and the next sheet of stack 12 by a nozzle 110 mounted on the end of a flexible hose 112 which is coupled to a source of pressurized air through sheet lifter 13. By the injected airstream the uppermost sheet is lifted in its entirety from the stack 12 while being held at the suction head 15 by the suction force of the vacuum. Suction head 15 then is moved towards an entrance 14 of a conveyor 17 whose entrance has the form of a slot between two opposing rollers 16 and 18. The rollers 16, 18, extend transversely to the transport direction (arrow 10) and are in frictional contact with each other. One of the rollers, say lower roller 16, is driven to rotate about its axis by a not shown drive mechanism. Idle roller 18 follows the rotation of roller 16 and is supported in bearings such that it may yield upwardly for opening entrance 14 when a leading edge of a sheet is to be inserted.

When the leading edge of the lifted uppermost sheet is grasped by rollers 16, 18, it is driven through the entrance 14 along belt conveyor 17 with a speed that corresponds to the circumferencial speed of roller 16.

Then the next sheet of stack 12 is lifted and fed into the entrance 14 between rollers 16 and 18. Such lifting and feeding is synchronized under control of computer 100 with the drive speed of the prevouis sheet such that the leading edge of the succeeding sheet enters entrance 14 when approximately one third of the length of the previous sheet is still outside entrance 14. Thus, all sheets of stack 12 are conveyed by conveyor 17 one after the other in an overlapped condition according to which approximately the trailing third of the length (taken in transport direction 10) of a sheet overlaps the leading section of the succeeding sheet. When a number of sheets of the stack 12 one after the other are removed the height of the stack 12 will diminish and consequently the vacuum head will be lowered from sheet lifter to a greater extent. Sheet lifter 13 includes a control mechanism which detects an extent of lowering the suction head 15 beyond a given value. The control mechanism then activates a lift 116 to which table 11 is coupled, to run upwardly along opposing columns 19 for raising table 11. A sheet supplying station 1 as described above may be obtained by MABEG Maschinenbau GmbH, Offenbach, Germany, with the machine identification no. 41988.

According to another embodiment of the invention the stack 12 and the related components and control may be arranged in a manner which allows an overlapping arrangement of the succeeding sheets in such a way that the leading section of each sheet overlies the trailing section of each preceding sheet.

The overlapped sheets that emerge from the sheet supplying station 1 are supplied by belt conveyor 17 to the entrance 24 of a registering portion 20 of double coating station 2. Within this registering portion, the transport speed of the overlapped sheets is raised to approximately threefold the speed of the sheets which are delivered by the belt conveyor 17, and the overlapping of succeeding sheets is reduced.

In detail, the registering portion 20 includes close to the entrance 24 a first pair of opposing rollers 21*a*, 21*b*, the axis of which extend parallel to those of rollers 16, 18. Roller 21*a* is arranged below the path 22 of the incoming overlapped sheets and is driven by a not shown drive mechanism controlled by the computer 100. Idle roller 21*b* is above path 22 and in frictional contact with roller 21*a*. Roller 21*a* is driven with the same speed as roller 16. Downstream of rollers 21*a*, 21*b* stop means 200 are provided in the path 22 which include a number of fingers which extend upwardly into path 22 and which are mounted on a common pivot axis below path 22. All fingers are aligned transversely to the transport direction 10. Upon a stop means in-activating command, all fingers may swung downwardly out of path 22 to allow the continuation of the run of the sheets towards another pair of rollers 23*a*, 23*b*. In the absence of such command (or if an inverted command is received), all fingers rock upwardly into path 22 for stopping further progress of an incoming sheet by abutment of the leading edge thereof against the raised fingers. Roller 23*a*, being arranged below path 22 is driven approximately three times faster than roller 21*a* whereas idle roller 23*b* above path 22 frictionally contacting roller 23*a* follows the speed of roller 23*a*.

When the leading edge of the first incoming sheet is escaping rollers 21*a*, 21*b* it may pass the inactivated stop means 200 and will be grasped in between rollers 23*a*, 23*b*. That sheet then will be accelerated corresponding to the higher speed of rollers 23*a*, 23*b*. Stop means 200 is activated timely such that the succeeding sheet will abut stop means 200. Under control of computer 100, stop means 200 is inactivated (i.e. the fingers are swung down out of path 22) at a time the overlapping of the first sheet and the succeeding sheet has reduced to approximately 1.0 to 2.0 cm (0.4 to 0.8 in). After the leading edge of the succeeding sheet (together with the trailing edge of the first sheet) has been grasped between rollers 23*a* and 23*b* stop means 200 is again activated for stopping the next sheet. Again, the computer 100 commands inactivating the stop means 200 at a time the overlapping of second sheet and third sheet has reduced to approximately the aforementioned extend.

The overlapping for 1.0 to 2.0 cm of succeeding sheets is maintained by strict control of the speeds of the drive mechanisms within the following portion of double coating station 2 and stations 3 and 4. The stop means 200 of the registering portion 20 also serves to properly align all incoming sheets before further processing thereof.

The accelerated overlapped sheets emerging the registering portion 20 are fed by assistance of guide rollers 28*a*, 28*b* into the coating portion 26 of double coating station 2 along the horizontally continuing path 22. Downstream of rollers 28*a*, 28*b* a first coating roller 25 is arranged above path 22 and a second roller 29 is arranged below path 22.

Figure 5:
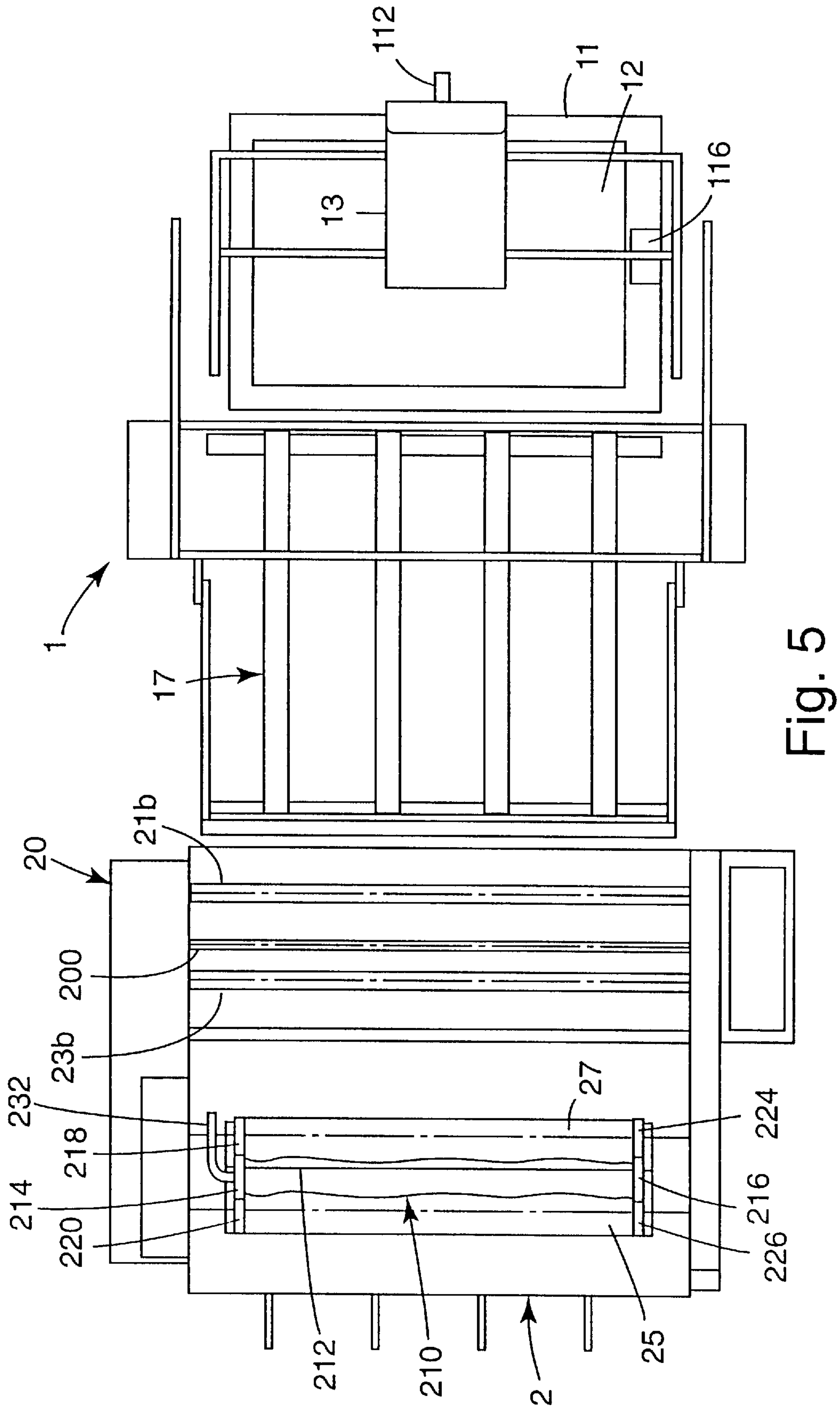
FIG. 5 is a top view of the apparatus according to FIG. 2.

The first coating roller 25 cooperates with a metering roller 27. A trough 210 for receiving a first liquid is formed by a portion of the circumference of the metering roller 27 adjacent a slot 212 between the metering roller 27 and the first coating roller 25, a portion of the circumference of the first coating roller 25 adjacent slot 212 and two opposing side walls 214, 216 each of which is held in cirumferencial grooves 218, 220 and 222, 224, respectively of the metering roller 27 and the first coating roller 25. As can best be seen from FIG. 5, those circumferencial grooves 218, 220, 224, 226 are spaced apart along the axis of rollers 25, 27 and provided close to the opposing end surfaces thereof. The width of slot 212 between metering roller 27 and first coating roller 25 may be adjusted for instance by moving metering roller 27 towards to or away from first coating roller 25. Thereby the amount of liquid which finds its way out of trough 210 through slot 212 upon the upper surface of the sheets passing underneath first coating roller 25 may be controlled. A sheet stripper (not shown) is abutting the periphery of the first coating roller downstream the contact thereof with the sheets to prevent a sheet from wrapping around the first coating roller 25.

The first liquid, in an embodiment of the invention, is a primer, which is an aqueous solution of an organic binding agent and a cleaved mineral pigment. Specifically, that solution is obtained by mixing approximately 5% by volume of a binding agent (available under the trademark MOVIOL from Hoechst AG, Frankfurt/Main, Germany) and approximately 5% by volume of pigment (available under the trademark AEROSIL from Degussa AG, Frankfurt/Main, Germany) with approximately 90% by volume of water.

Thus, by rotating first coating roller 25 and metering roller 27 a continuous layer of primer is laid down on the web-like overlapped sheets across their width when they are passed underneath the first coating roller 25.

Above trough 210 a pump 228 is provided, the outlet pipe 230 of which opens above trough 210. The inlet port of pump 228 is connected to a suitable hose or pipe (not shown) to a source of the first liquid (primer). Moreover, trough 210 is provided with an overflow line 232 which returns to said source.

Figure 2:
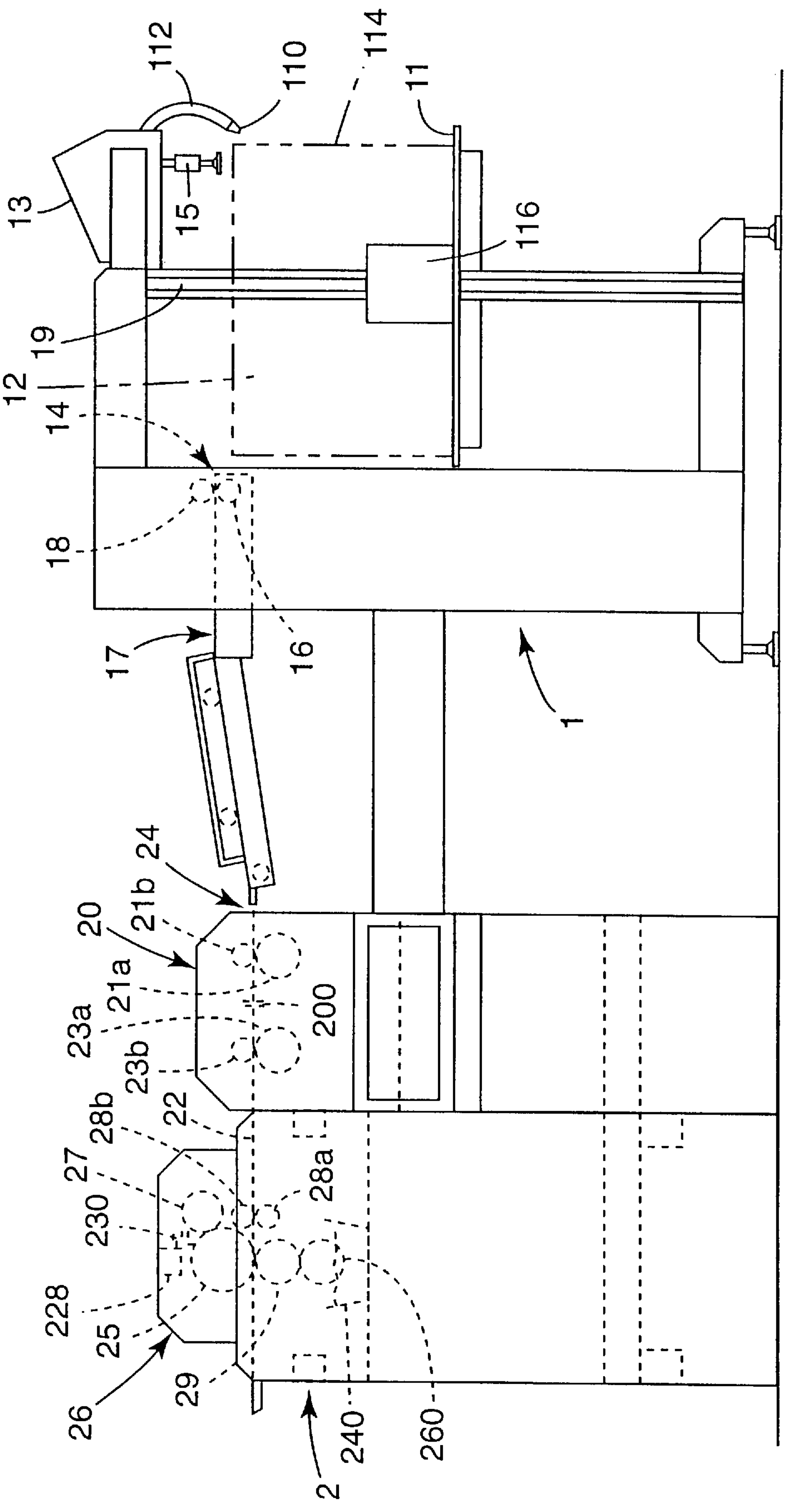
FIGS. 2, 3 and 4 are a schematic side view of stations of the apparatus of FIG. 1.

Below path 22 and vertically below first coating roller 25 a second coating roller 29 is provided which rotates with the same speed as the first coating roller 25 which corresponds to the accelerated transport speed of the overlapped sheets. A tank 240 for receiving a second liquid is held below second coating roller 29. A baling roller 260 is provided underneath and in contact and parallel to second coating roller 29 which, when tank 240 by not shown means is filled with that second liquid, dips into that liquid (FIG. 2, 7). When second coating roller 29 and baling roller 260 are driven to rotate about their axes, liquid out of tank 240 is entrained with baling roller 260 and transferred to the periphery of second coating roller 29, which applies that liquid to the lower surface of the sheets passing between first and second coating rollers 25, 29. The circumferencial surface of the second coating roller 29 in the direction of the axis of that roller is for about 1.0 to 2.0 cm (0.4 to 0.8 in) shorter than the width of the sheets to be coated to prevent the liquid coated upon the upper surface of the sheets from floating over the edges of the sheets and to mix with the liquid on the second coating roller 29. In the event the width of the sheets of another batch is smaller, the second coating roller 29 has to be replaced by a correspondingly shorter coating roller. By adjusting the pressure of the baling roller 260 against the second coating roller a desired thickness of the layer coated on the underside of the sheets by the second coating roller 29 may be obtained. A not shown sheet stripper is positioned to abut the second coating roller 29 downstream of the contact area of the second coating roller 29 with the sheets to prevent the sheets from wrapping around the second coating roller.

The second liquid, in an embodiment of the invention, is a low adhesion backsize, which is an aqueous solution of an organic binding agent and an adhesive rejecting agent. Specifically, that solution may be made by mixing approximately 2% by volume of FINFIX BDA distributed by Nordmann and Rassmann, Hamburg, Germany, as binder, and approximately 10% by volume of TEGO-GLIDE 410 distributed by Tego-Chemie GmbH, Essen, Germany, as rejecting agent, and approximately 13% by volume of ethanol with approximately 75% by volume of water.

The above identified figures for percentages of ingredients may vary dependent from the characteristics of the used paper sheets.

Because the aqueous primer and the aqueous low adhesion backsize are applied to the sheets simultaneously and at the same position along the path 22 by first coating roller 25 and second coating roller 29 respectively, the forces that would otherwise lead to curling or cockling of the sheets substantially counteract against each other, so that the sheets retain their smooth, even form.

In a preferred embodiment, at least one, and preferably both of the coating rollers 25 and 29 are interchangeable with coating rollers of different length suitable for use with more narrow and wider sheets, respectively.

The quantity of the aqueous solution of the primer deposited on the upper surface of the sheets may be controlled by the width of slot 212 such that approximately 2 g/m$^2$ are deposited continuously upon the sheets. Similarly, the aqueous solution of low adhesion backsize deposited upon the undersurface of the sheets may range approximately to 2 g/m$^2$ continuously along the total width of the sheets.

As a safety feature, a photo cell positioned ahead the coating rollers 25, 29 may monitor the presence of sheets along the path 22 within coating portion 26. In case the photo cell does not detect a sheet, the output signal thereof may cause lifting of the first coating roller 25 away from second coating roller 29, or in the alternative, may cause lowering second coating roller 29 with respect to first coating roller 25 in order to prevent contact of both rollers in the absence of sheets therebetween.

The overlapping arrangement of the sheets, and the reduced length of the low adhesion backsize roller both tend to prevent intermingling of the primer and the low adhesion backsize materials.

Figure 3:
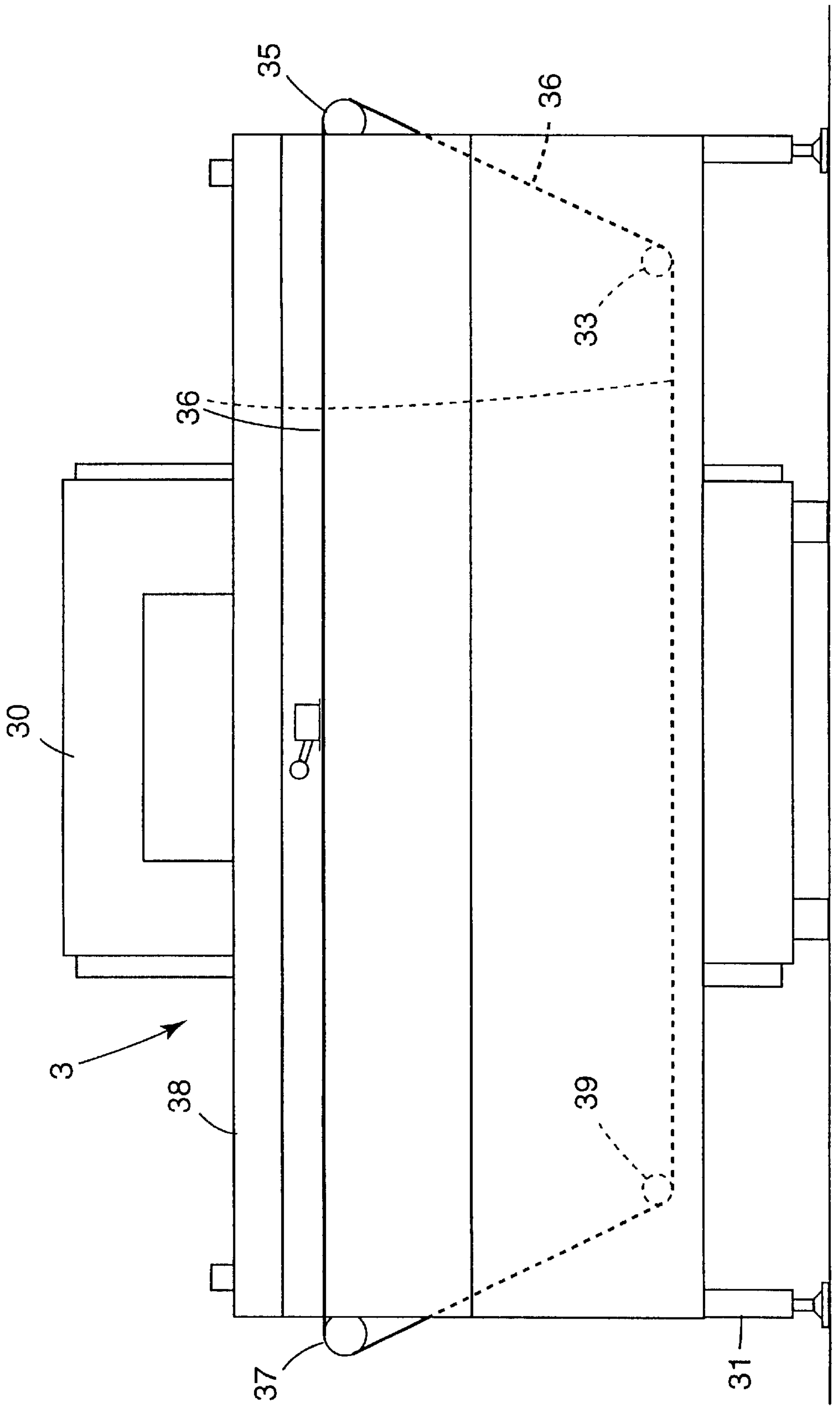

The sheet transport station 3 (FIG. 3) includes a frame 31, within which an endless vacuum belt 36 winds around rollers 33, 35, 37, 39, which are transverse to the transport direction 10. At least one of said rollers is driven under control of the computer 100 such, that the endless vacuum belt 36 advances through the sheet transport station 3 with exactly the same speed as the speed of the sheets emerging from the double coating station 2. Thereby, the overlapped condition of 1.0 to 2.0 cm is maintained during passage of the sheets through station 3 above the portion of belt 36 between rollers 35 and 37. The overlapped sheets when advancing through station 3 upon belt 36 between rollers 35 and 37 are exposed to drying means for removing moisture from the primer solution and from the low adhesion backsize solution. In the illustrated embodiment, the drying means is shown as high frequency radiation source 38, which is powered by generator 30, located adjacent frame 31. In a preferred embodiment, one or more high frequency radiation sources are provided to dry the sheets. The frequency of the radiation emitted by the source 38 may be in the range of approximately 27 MHz. Importantly, the radiation does not interact with the material of the sheets, but deposits its energy within the primer layer and the low adhesion backsize layer to dry those layers. Stated differently, the sheets should preferably be radiation transparent with respect to the high frequency radition, but the primer and low adhesion backsize should be radiation opaque with respect to that radiation.

For removing the moisture evaporated from the primer layer and the low adhesion backsize layer, the interior of the frame may be ventilated by a continuous stream of dry air which may be introduced into the frame 31 above belt 36 and may escape from the frame through its bottom. In this way the water in the primer layer and low adhesion backsize layer is finally removed, so that the sheets are substantially dry as they exit the transport station 3 at roller 37.

The primer and low adhesion backsize layers should be dried at rates sufficient to prevent the sheets from curling. In a preferred embodiment the primer and low adhesion backsize are applied simultaneously, and are dried simultaneously at a uniform rate, so that the sheets do not curl or wrinkle. However, the primer and low adhesion backsize layers could be applied sequentially, or could be dried at differential rates, or both, as necessary to attenuate or prevent curling and wrinkling of the sheets.

Coating station 4 applies a pressure sensitive adhesive to the sheets on the same surface where the primer was applied by double coating station 2, by contacting the sheets with an adhesive coated transfer belt 42. In the illustrated embodiment, coating station 4 includes a table 40 upon which an endless vacuum transport belt 49 is advanced in transport direction 10. The speed of the belt 49 is controlled by computer 100 and is the same as the transport speed in station 3. Above table 40 a raised dome 41 is provided within which runs the endless transfer belt 42. Transfer belt 42 winds around roller 43*a* and application roller 45 and around rollers 43*a*, 43*b*, 43*c*, 43*d*, and transfer roller 44, at least one of which is driven. Transfer belt 42 may be made of, for example, silicon rubber.

Figure 6:
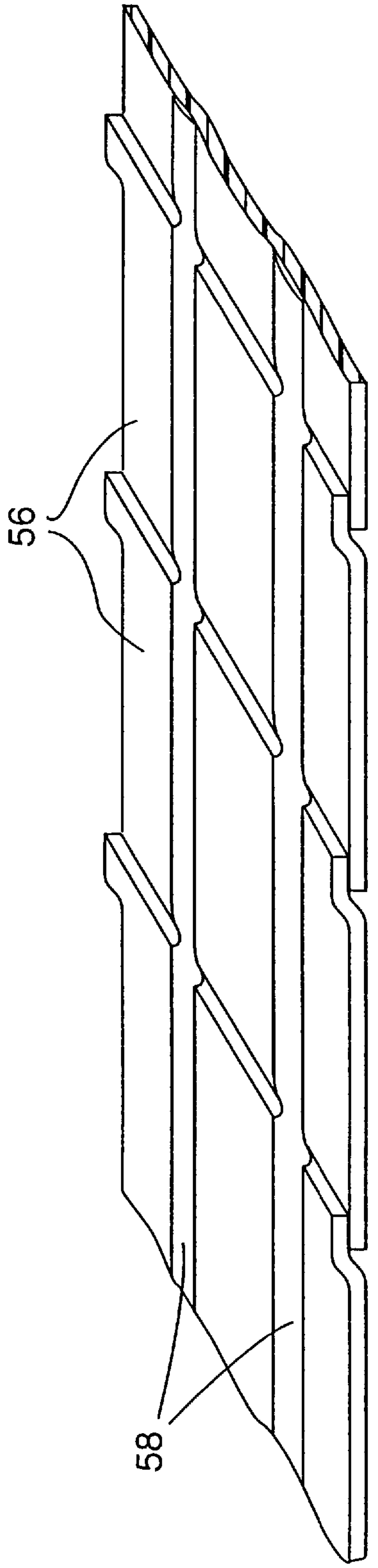
FIG. 6 is a perspective view of several overlapping sheets having a coating material applied thereto in accordance with the present invention.
Figure 7:
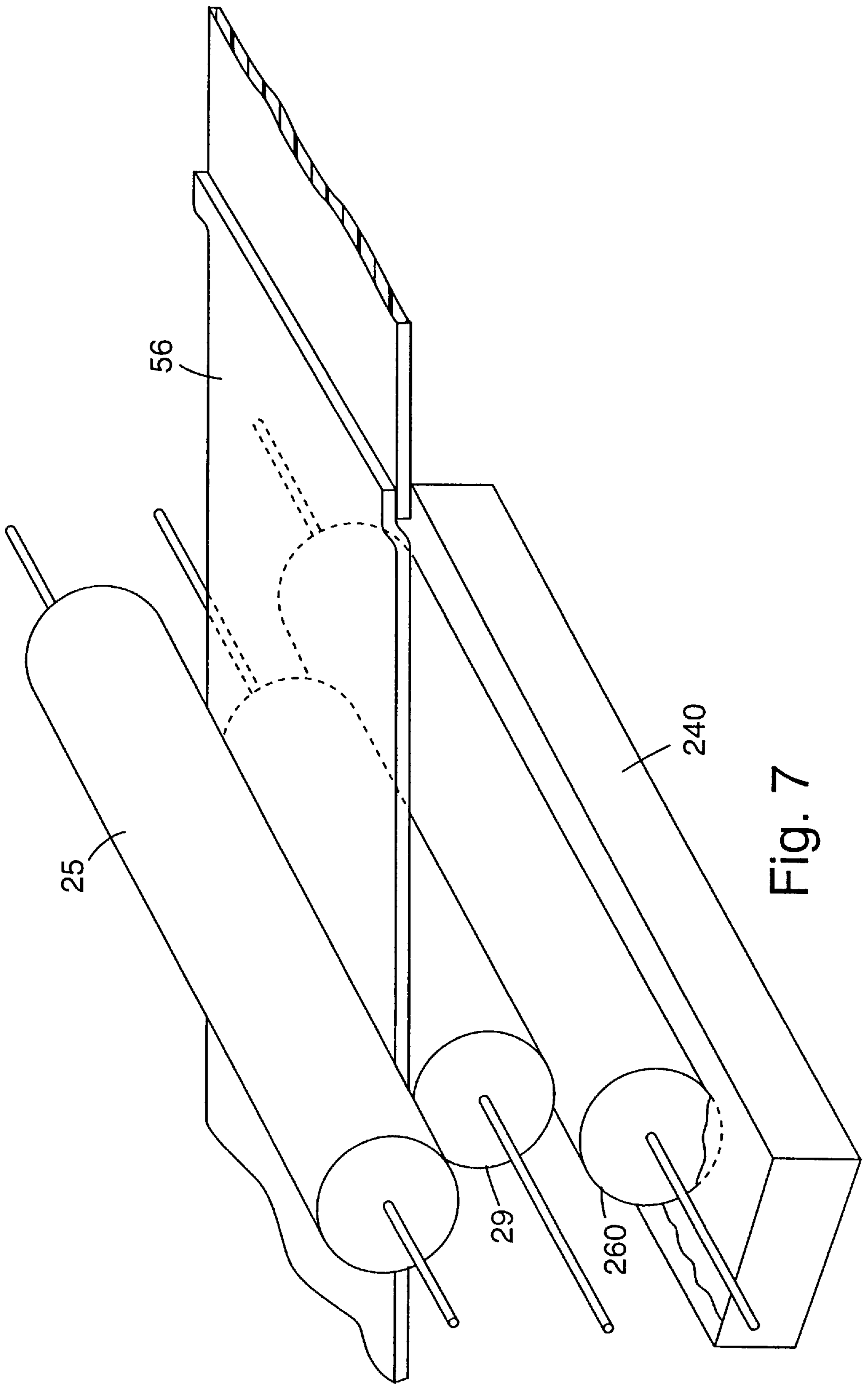
FIG. 7 is a schematic diagram of a detail of the apparatus according to the invention.

Application roller 45 preferably comprises a peripheral cylindrical surface having a plurality of cavities, or intaglio cells, for receiving pressure sensitive adhesive from a supply of such adhesive contained within tube 46. The adhesive may be formulated according to U.S. Pat. No. 4,495,318 to Howard or, in the alternative, according to U.S. Pat. No. 3,691,140 to Silver, the contents of each of which are incorporated herein. Application roller 45 is interchangeable with other types of application rollers, so that pressure sensitive adhesive may be applied to transfer belt 42 in different patterns, at different coating weights, and at different line speeds. In the disclosed embodiment of the invention, the intaglio cells may extend completely around the periphery of application roller 45 in spaced rings for obtaining spaced and lengthwise adhesive strips 58 on sheets 56 (FIG. 6).

Figure 4:
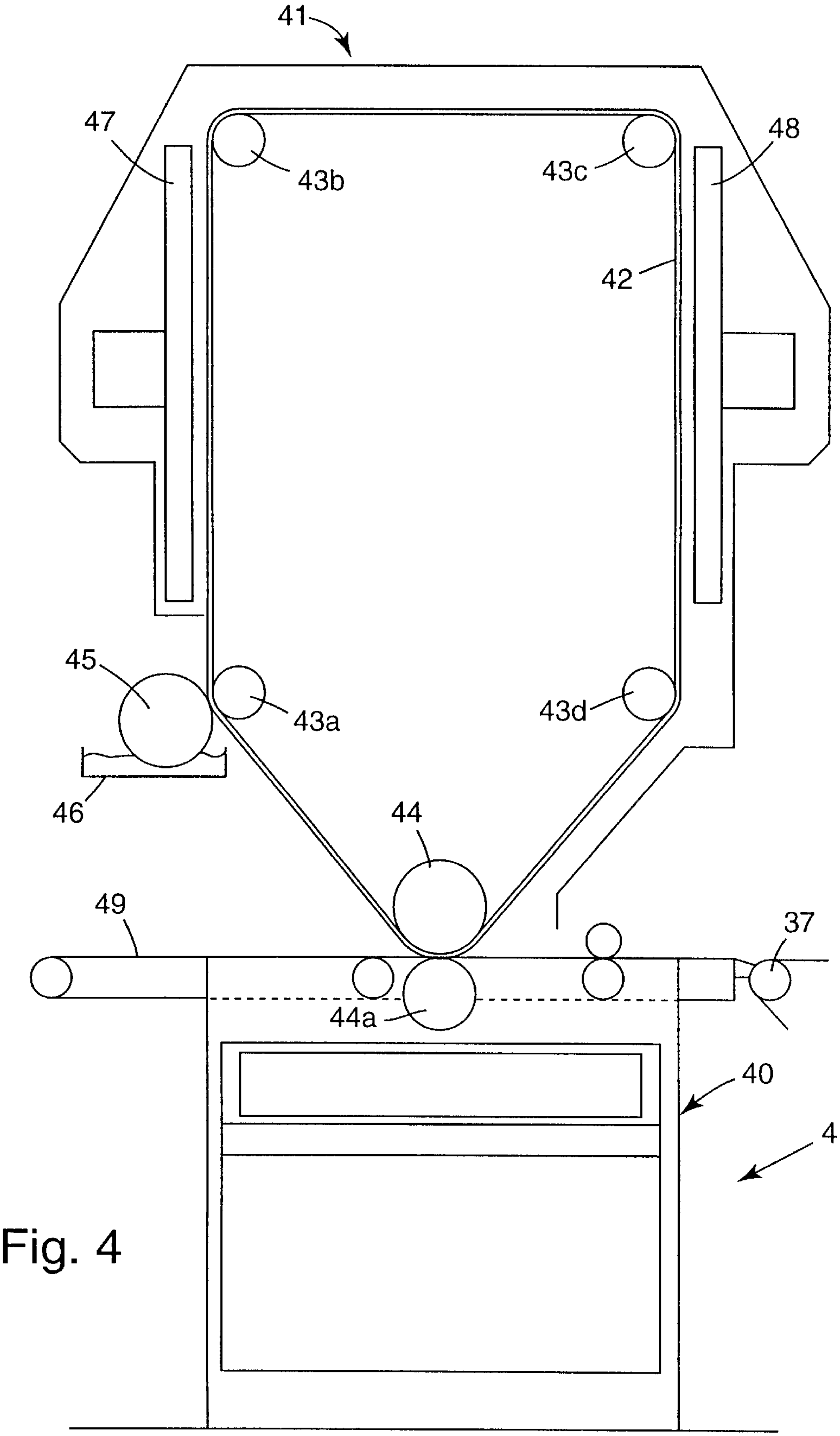

Application roller 45 preferably rotates such that the peripheral surface of the application roller moves in the opposite direction of transfer belt 42, as shown in FIG. 4. A doctor blade may also be provided between tube 46 and transfer belt 42, to doctor off excess adhesive from the application roller so that only the adhesive within the intaglio cells is applied to the transfer belt 42.

Transfer belt 42 is entrained over rollers 43*a*, 43*b*, 43*c* and 43*d*, and the adhesive carried on the transfer belt is exposed to a first heating device 47, and subsequently to a second heating device 48. Heating devices 47 and 48 are preferably infrared heating devices, although other heating devices, such as high frequency heaters, are also contemplated. Also, more or less heating devices and those shown may be provided. When a section of transfer belt 42 that has been coated with adhesive has passed first and second heating devices 47 and 48, the adhesive on transfer belt 42 is substantially dry, and can be applied to the overlapped sheets by transfer roller 44. One or more optional temperature feedback sensors (not shown) may be positioned adjacent the heating devices, to measure the temperature of the adhesive layer and to adjust the amount of heat applied by the heating devices to dry the adhesive sufficiently.

The adhesive is transferred from the transfer belt 42 to the overlapping sheets at an application interface between transfer roller 44 and opposed roller 44*a*. Opposed roller 44*a* supports the sheets against the transfer roller 44, and after the adhesive has been applied to the sheets, the coated sheets are conveyed toward sheet inserting station 5 by vacuum belt 49 for further processing.

The pattern of adhesive disposed on the sheets depends on the pattern of adhesive applied by application roller 45 to transfer belt 42. In one embodiment, application roller 45 includes a plurality of intaglio cells arranged in two bands spaced along the application roller. Thus, two continuous bands of adhesive are applied to the transfer belt 42, and subsequently to the overlapped sheets. The sheets so produced are illustrated in FIG. 6, wherein sheets 56 include spaced bands of adhesive 58. After sheets 56 have been stacked in the manner described below with respect to stacking station 6 to form master pads, the master pads may be guillotined into individual pads of repositionable notes. The location, coating weight, and other characteristics of the pressure sensitive adhesive layer applied to the sheets may be changed by changing the application roller, or by altering the operating parameters such as line speed, adhesive properties, and the like.

The overlapped sheets that emerge from coating station 4 on vacuum belt 49 are conveyed to sheet inserting station 5, which draws the sheets with a slightly higher speed. Thereby, the overlapping of succeeding sheets is removed so that a leading edge of a sheet follows a trailing edge of the preceding sheet. In station 5 a sheet may be injected between coated sheets at desired intervalls. The injected sheets preferably are different from the coated sheets (a different color or material, for example), although they may instead be similar to the coated sheets. Preferably, the injected sheets are uncoated, and form the bottom sheet of a master pad of repositionable notes.

Sheet inserting station 5 contains a substantially horizontal transport floor 51 having transport belts (not shown). Frame 52 supports transport floor 51, below which is a sheet stacker 53. Sheet stacker 53 has a stack 55 of uncoated sheets that are deposited on plate 54. Further, the sheet inserting station may include a counter (not shown) that counts the sheets delivered from coating station 4. After a predetermined number of coating sheets are counted, the counter signals the sheet inserting station 5 to inject an uncoated sheet from stack 55 between the coated sheets, via a ramp rising from stack 55 to transport floor 51.

The sheet inserting station 5 is coupled to the exit side with a sheet stacking station 6, in which the sheets received from the sheet inserting station 5 are collected and are aligned with each other. The aligned, coated sheets are then deposited in the form of stack 62 on plate 61. The stacks of sheets may then be compressed to form master pads of repositionable notes, removed, and guillotined as known in the art to form individual pads of repositionable notes. Depending on the adhesive formulation coated onto the sheets, it may be desirable to allow the coated sheets to age (12 hours, for example) prior to guillotining, to allow the adhesion strength to increase as the adhesive dries more completely.

The above described machine may be run such that an output of approximately 4000 coated sheets per hour is obtained.

The advantages of the described apparatus are numerous. For example, the coating of supplied sheets of paper or similar material with pressure sensitive adhesive stripes is achieved in such a way that the sheets typically do not show any waviness, curling or other deviation from flatness. Also, the inventive apparatus permits sheets of various sizes to be coated, limited only by the width of the transport mechanism that conveys the sheets through the apparatus. Thus, aside from the installation of suitable coating and transfer rollers, no other changes in machine parts are needed when the size of the sheets which are to coated is changed.

Other benefits include the ability to provide sheets having different printed messages, different cutters, different materials (recyled or virgin paper, for example), or different textures, for example, within a single batch or stack of sheets. For example, a calender (having different printed information on each sheet) could be easily produced by the method of the present invention if the stack of sheets were organized in the proper order. Another advantage is that the coating materials used with the present invention are preferably water based, and thus potentially harmful organic solvents may be eliminated from the coating process.

The present invention has now been described with reference to several embodiments thereof. It will be apparent to those skilled in the art that many changes can be made in the embodiments described without the departing from the scope of the invention. Thus, the scope of the present invention should not be limited to the structures described herein, but rather by the structures by the language of the claims, and the equivalents of those structures.

I claim:

1. A method of applying a coating material to a plurality of sheets, comprising the steps of:

(a) providing a plurality of sheets;

(b) overlapping the sheets, such that at least a minor portion of each sheet overlies a minor portion of an adjacent sheet, and at least a minor portion of each sheet underlies a minor portion of a second adjacent sheet;

(c) providing a source of coating material;

(d) disposing the coating material on a transfer surface;

(e) applying the coating material to a first major surface of the overlapping sheets by contacting the sheets with the transfer surface to apply the coating material to the sheets as the sheets are conveyed past the transfer surface; and (f) collecting the coated sheets.

2. The method of claim 1, wherein the coating material is a pressure sensitive adhesive.

3. The method of claim 2, wherein the coating material is a water-based pressure sensitive adhesive.

4. The method of claim 1, wherein the sheets are paper.

5. The method of claim 1, wherein step (d) further comprises at least partially drying the coating material while the coating material is disposed on the transfer surface.

6. The method of claim 1, wherein the method further comprises a step (d') of coating a primer on the first major surface of the sheets, and coating a low adhesion backsize on the second major surface of the sheets, step (d') occuring before step (d).

7. The method of claim 6, wherein the primer coating and the low adhesion backsize coating are applied simultaneously.

8. The method of claim 6, wherein step (d') further includes drying the primer and the low adhesion backsize onto the sheets.

9. The method of claim 8, wherein the primer and low adhesion backsize coatings are dried at a rate sufficient to prevent curling and wrinkling of the sheets.

10. The method of claim 8, wherein the primer and the low adhesion backsize are dried by high frequency radiation.

* * * * *